Dec. 18, 1962 J. THEUER 3,068,975
PRIME MOVER WITH AUTOMATIC BRAKE
Filed Nov. 3, 1959 11 Sheets-Sheet 3

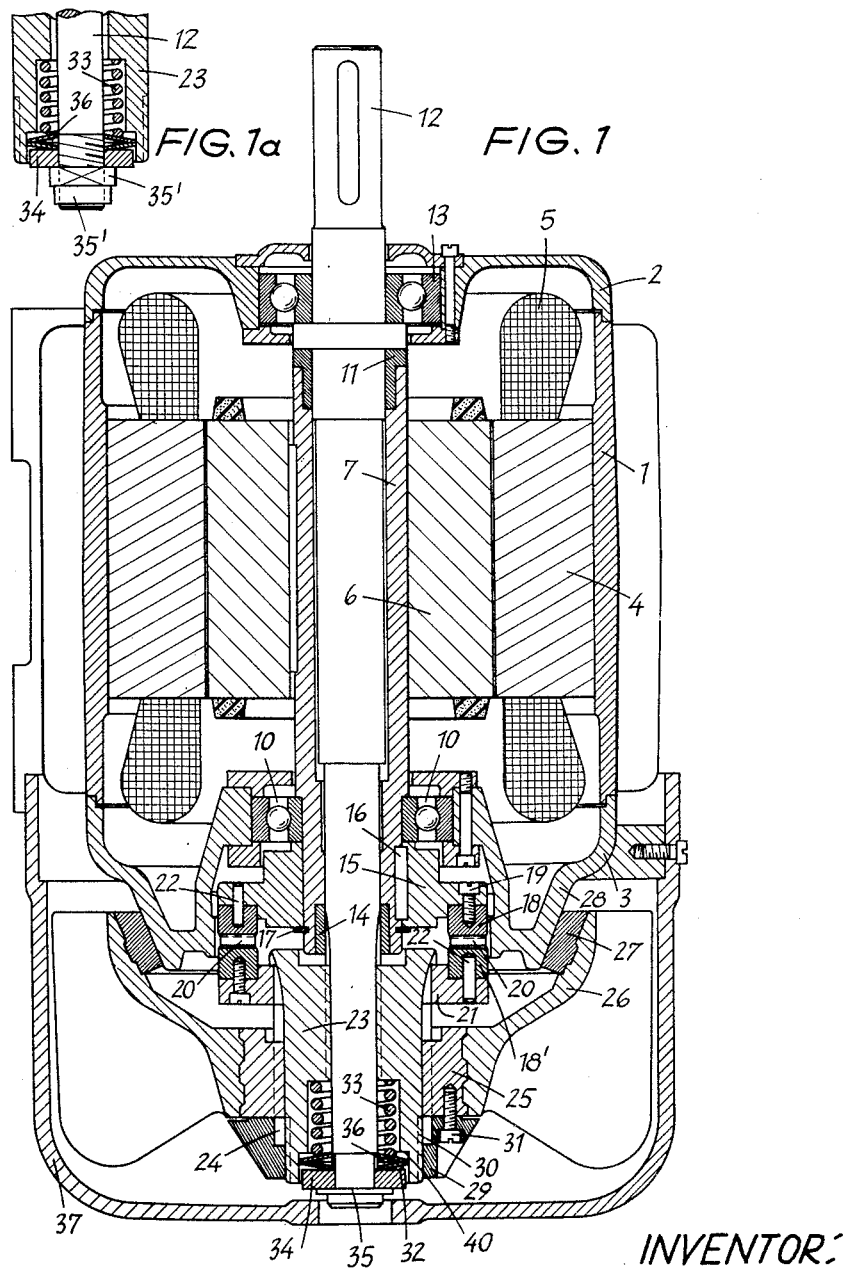

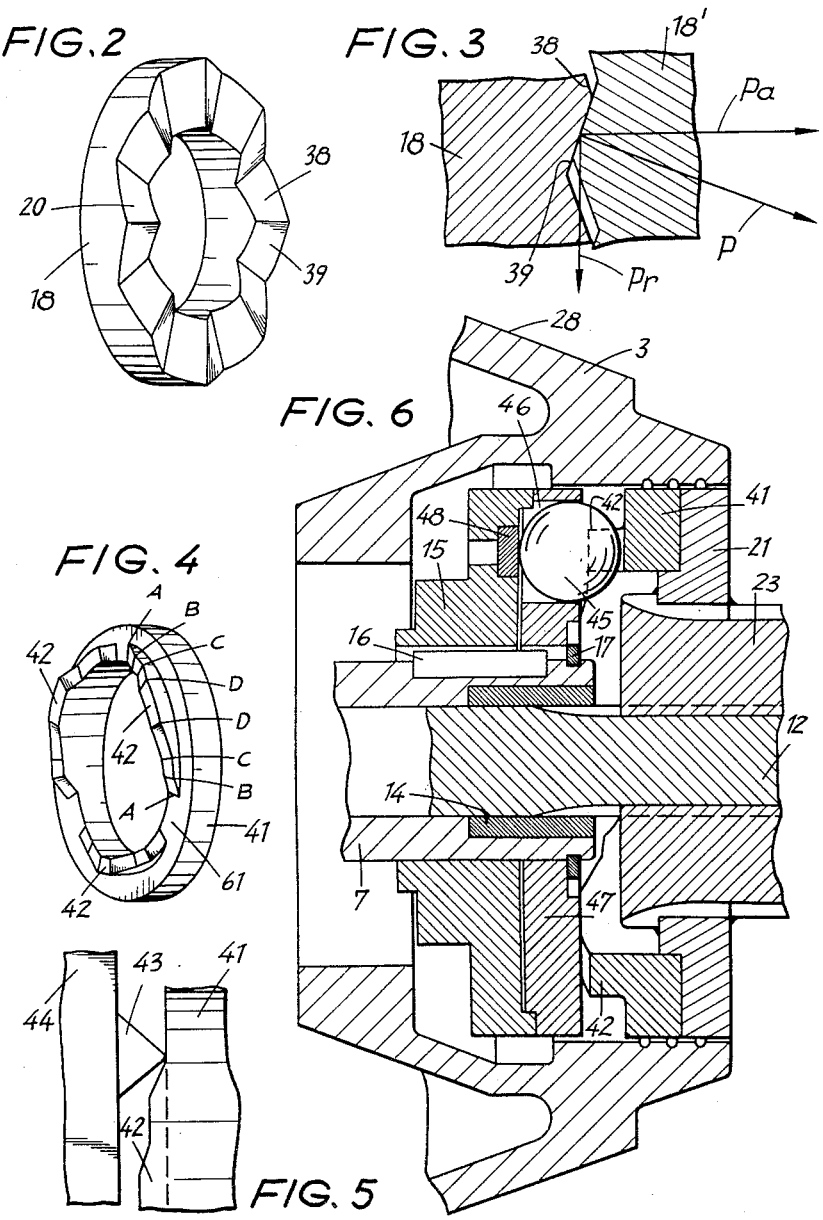

INVENTOR:
JOHANN THEUER

By
PATENT AGENT

INVENTOR:
JOHANN THEUER

By

PATENT AGENT

Dec. 18, 1962     J. THEUER     3,068,975
PRIME MOVER WITH AUTOMATIC BRAKE
Filed Nov. 3, 1959     11 Sheets-Sheet 5
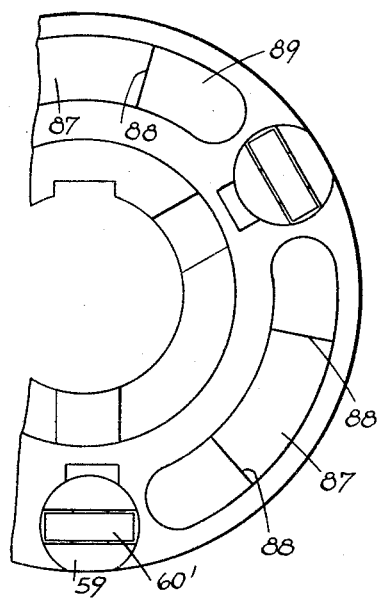
FIG. 11
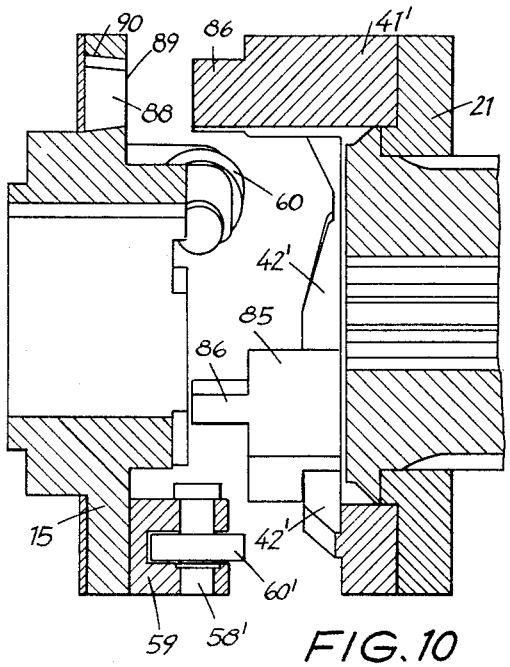
FIG. 10
FIG. 12
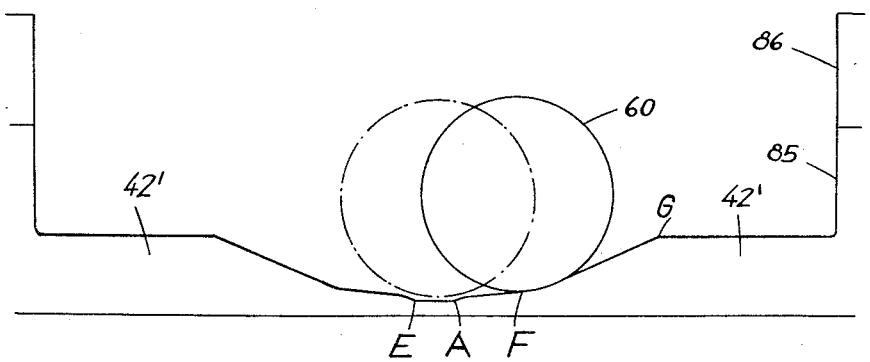
INVENTOR:
JOHANN THEUER
By
PATENT AGENT

INVENTOR:
JOHANN THEUER

Dec. 18, 1962     J. THEUER     3,068,975
PRIME MOVER WITH AUTOMATIC BRAKE
Filed Nov. 3, 1959     11 Sheets-Sheet 7
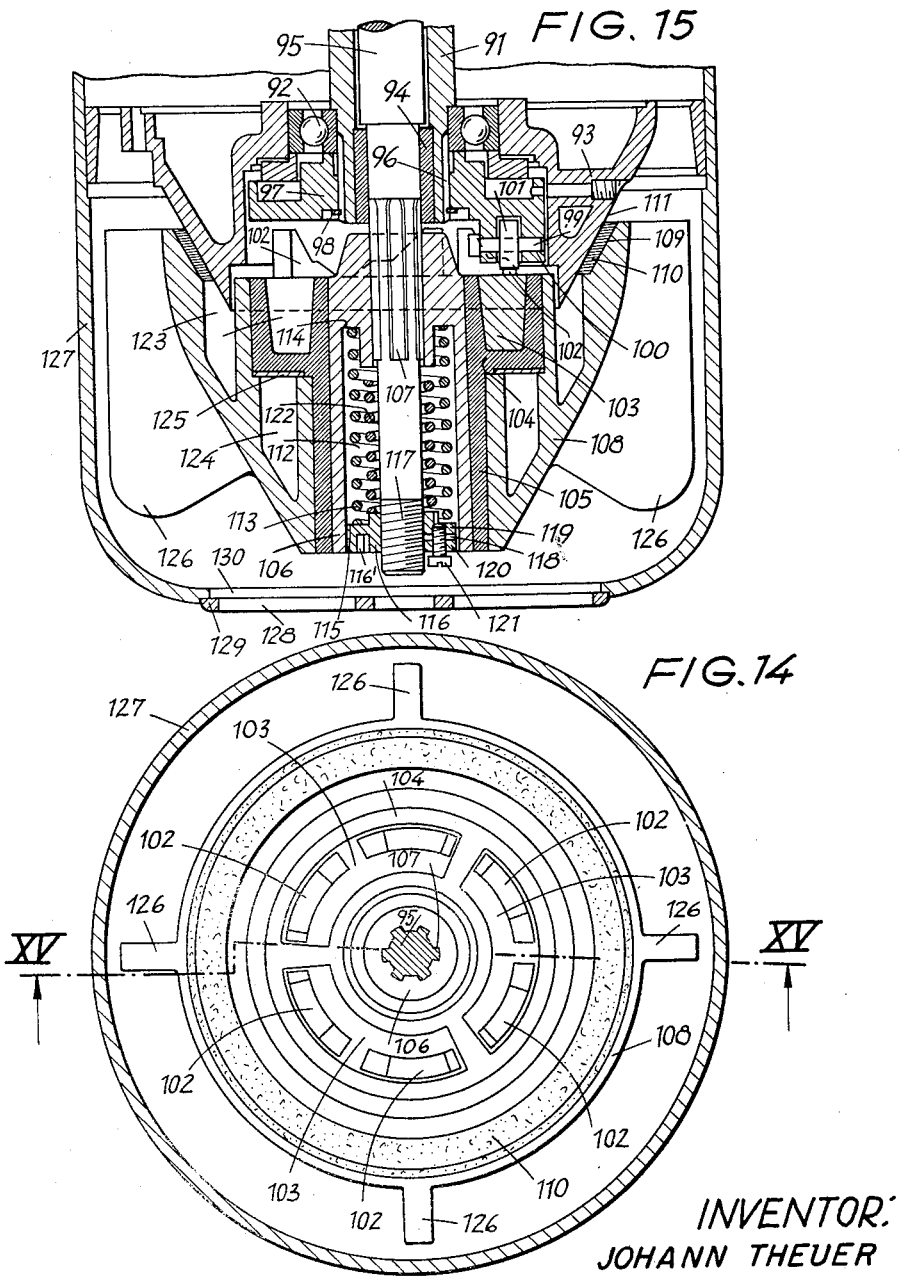
INVENTOR:
JOHANN THEUER
By
PATENT AGENT Dec. 18, 1962 J. THEUER 3,068,975
PRIME MOVER WITH AUTOMATIC BRAKE
Filed Nov. 3, 1959 11 Sheets-Sheet 8

INVENTOR:
JOHANN THEUER

By

PATENT AGENT

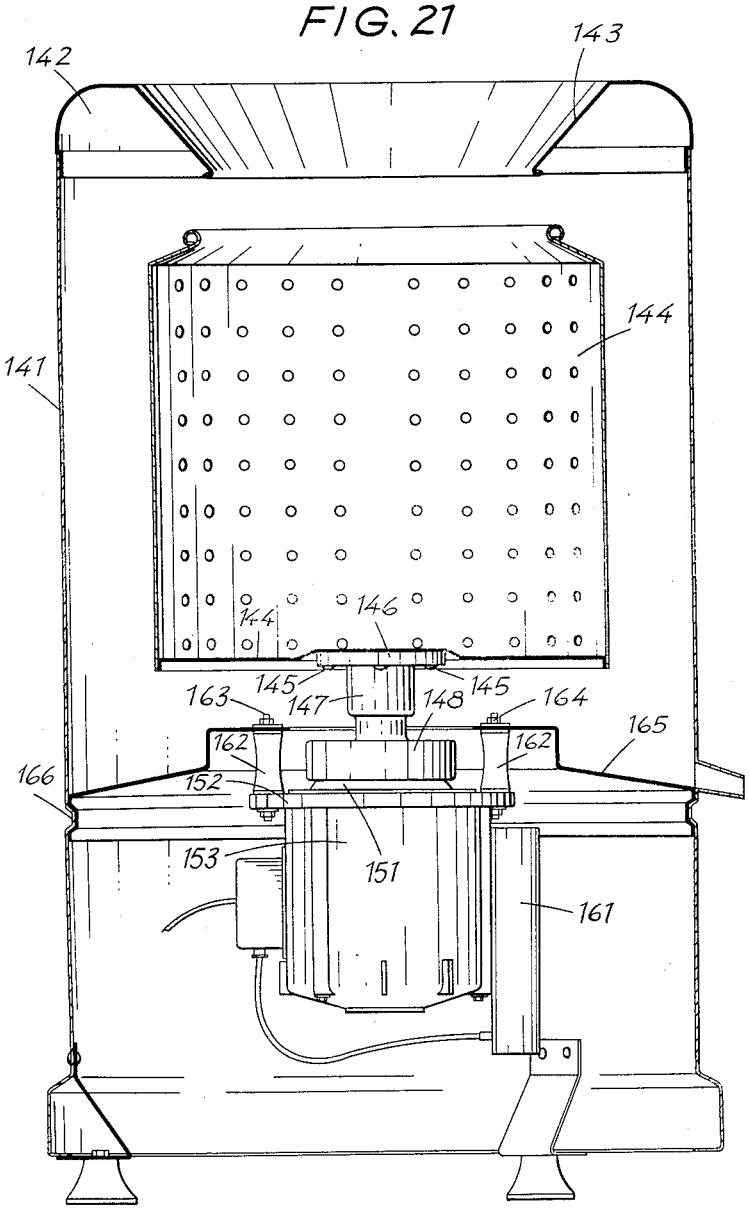

Dec. 18, 1962  J. THEUER  3,068,975
PRIME MOVER WITH AUTOMATIC BRAKE
Filed Nov. 3, 1959  11 Sheets-Sheet 10

INVENTOR:
JOHANN THEUER

By

PATENT AGENT

Dec. 18, 1962     J. THEUER     3,068,975
PRIME MOVER WITH AUTOMATIC BRAKE

Filed Nov. 3, 1959     11 Sheets-Sheet 11

INVENTOR:
JOHANN THEUER

By

PATENT AGENT

United States Patent Office 3,068,975
Patented Dec. 18, 1962

3,068,975
PRIME MOVER WITH AUTOMATIC BRAKE
Johann Theuer, Pfaffenbuhl 35, Marktredwitz, Upper Franconia, Bavaria, Germany
Filed Nov. 3, 1959, Ser. No. 850,689
Claims priority, application Germany Nov. 8, 1958
15 Claims. (Cl. 192—8)

The present invention relates to a prime mover, for example, an electric motor, an internal combustion engine, a turbine, or the like which is provided with a brake which is automatically engaged when the driving force ceases, and which is automatically disengaged when the driving force becomes effective.

Prior to this invention, there have been designs of electric motors which are known as sliding rotor motors. Such a motor is provided with a conical rotor and a similar stator. When the motor is switched on, the conical rotor is drawn by the magnetic force of the stator field against the action of a brake spring into the conical stator, whereby the brake will be disengaged and the rotor freed for rotation. These known electric motors with sliding rotor brakes have certain disadvantages which are partly due to the fact that the magnetic force which is exerted by the stator upon the sliding rotor in the axial direction thereof for drawing the conical rotor into the conical bore of the stator has a limited value depending upon the power of the motor. This limitation of the axially extending force which acts upon the sliding rotor also requires a limitation of the size of the axial force which is produced by the brake spring and which is equal to the axial shifting force of the stator but directed opposite thereto and therefore has to be overcome by the magnetic force in order to disengage the brake. The force of the brake spring is, however, one of the two factors which determine the size of the attainable braking couple, the other factor being the angle of the taper of the conical brake surfaces of the brake. In order to attain the greatest possible braking couple it is therefore necessary to make this angle as closely as possible to the angle at which the two associated conical brake members become self-locking. Any further reduction of the taper angle would therefore result in a sticking of the brake lining on the other brake surface, and it is thus not possible in such braking motors of a given power which are provided with sliding rotors to increase the braking couple beyond the mentioned limit.

For this reason, the known braking motors with sliding rotor brakes are also not provided with any means for adjusting the size of the braking couple. Therefore, the braking effect may not be varied in accordance with the particular requirements, and the braking distance, i.e. the number of rotations of the driven shaft after the motor has been switched off, may not be increased or decreased, but the brake will always remain set to the maximum value of the braking couple and can be weakened only by an installation of weaker springs. The dependency of the disengagement of the brake upon the magnetic field means, in turn, a dependency upon the power-supply voltage. If there is a considerable drop in voltage, the brake will no longer disengage, and it can function properly only as long as there are only relatively small variations in voltage. Furthermore, the action of the brake depends upon the position of the motor shaft insofar as a different spring is required for each different axial position of the driven shaft. Thus, for example, if the driven shaft extends horizontally, it requires a different spring than when it extends vertically upward or vertically downward. A further advantage of these prior brake motors with sliding rotors consists in the axial shifting movement of the driven shaft which is required to render them operable and amounts to 1 to 3.5 mm. Any interference with this axial movement is bound to result in serious difficulties or may even render the brake motor inoperative since any additional axial extending forces would also have to be overcome by the magnetic field. Thus, for example, belt transmissions used with such motors should never be under too great a tension, spur gears which are mounted on the driven shaft of the motor should never exceed a certain friction in the axial direction caused by the flank pressure, while helical gears may not be used at all on the driven shaft or only if they are of a special design, whereas clutches must have a certain end play. Furthermore, the production of the conical stators and rotors of such motors is very complicated and expensive.

It is an object of the present invention to overcome all of these disadvantages by providing a coupling for connecting the drive shaft of the motor or the other prime mover with a driven shaft and by designing this coupling so that the coupling member which is secured to the driving shaft is rotatable about an angle, the size of which is determined by an opposing force, while the relative movement of the coupling members is utilized for disengaging the brake. This relative movement of the coupling members may be attained by many different means. Thus, for example, a very simple means consists of suitable projections on the face of one of the coupling members and one or more inclined cam surfaces on these projections. If a torque is transmitted to these cam surfaces, they will produce an axially directed shifting force on the coupling members which may then be utilized according to the invention to disengage the brake.

An important feature of the present invention consists in the fact that the movable brake member is connected to the coupling member which is slidably mounted on the driven shaft so that any axially directed displacement of this coupling member also results in an axial displacement of the movable brake member and thus in a disengagement of the brake.

A very simple and preferred embodiment of the coupling according to the invention consists in providing the opposite faces of the two coupling members with substantially triangular interengageable teeth of an equal slope at the two sides of each tooth. As soon as the driving force starts, an axially directed force is exerted by the inclined surfaces of the teeth upon the coupling members, whereby, during the relative movement of the two coupling members, the coupling member which is mounted on the driven shaft will be shifted in the axial direction together with the brake member which is connected thereto so that the brake will be disengaged. The triangular shape of the teeth insures that the same effect will be attained regardless of whether the two shafts run with a right-hand or left-hand rotation.

According to another feature of the invention, the opposite faces of the coupling member are provided with projections and flat radial surfaces between the adjacent projections. This considerably simplifies the production of the coupling members since it is not necessary to provide the entire front side of each coupling member with an inclined surface.

Another preferred feature of the invention consists in making the projections on one of the coupling members in the form of balls which are held thereon in a fixed position and may consist of conventional steel balls as used in ball bearings. Instead of such balls it is also possible to use ball bearings with bearing races or rollers which are rotatably mounted on cylindrical shafts. Since such rollers are subjected to centrifugal forces and other forces which act in a lateral direction, it may be advisable to mount them between pointed centers or in a manner so as to permit them to turn freely also in a lateral direction. It is thus possible to avoid any additional friction when the rollers move along the inclined surfaces.

Further very important advantages will be attained according to the invention by providing each cam portion on one of the two coupling members with a portion which ascends from the flat base surface at an angle of, for example, 30° and another portion which has an angle of, for example, 20°, and by connecting these two portions to each other by a short arcuate surface portion. The 30° portion then serves for disengaging the brake, the adjacent arcuate portion for maintaining the brake in the disengaged position even when the motor is idling, and the 20° portion for engaging with the projections on one coupling member consisting of balls, rollers, or ball bearings when the motor is running under a load in the normal operation thereof. In order to permit a rotation of the shafts either in the right-hand or left-hand direction, the inclined cam surfaces on each of the projections along which these balls, rollers, or the like are adapted to roll are made symmetrical to each other at both sides thereof.

According to another feature of the invention, one coupling member is rigidly secured to the driving shaft, while the other coupling member is connected to the driven shaft so as to be slidable in the axial direction but nonrotatable relative thereto. Since a displacement of the driven shaft in the axial direction will thus be prevented, it is easily possible properly to mount the driven shaft without requiring a thrust bearing.

Another feature of the invention consists in providing the drive shaft in the form of a hollow shaft, and in extending the driven shaft through the hollow drive shaft and rotatably mounting it therein. This feature has the advantage of allowing a considerable saving in the amount of required space and of permitting an easy access to the brake elements. A further feature of the invention consists in the fact that the connection between the movable brake member and the other brake member, which is mounted on the driven shaft so as to be nonrotatable but slidable in the axial direction relative thereto, is also designed so as to be nonrotatable but axially slidable. The movable brake member may then also be designed to serve as a ventilator of the brake and be made of a light metal or similar material. In order to insure a power transmission from the coupling member to the brake member which will be fully reliable and of an adequate solidity to sustain even the greatest strains which might occur in the operation, a bushing of a sufficiently solid material may be inserted in and rigidly secured to the hub of the brake member. The adjustability of the brake member in the axial direction relative to the associated coupling member is produced by an axially adjustable connecting member between the brake member and the coupling member. This adjustable connecting member may consist, for example, of a nut which may be screwed upon the hub of the coupling member and is removably connected to the brake member. An adjustment of this nut will adjust the brake to compensate for any wear of the brake lining and also vary the distance between the two coupling members.

The axially movable coupling member is provided at its outer hublike end with a socketlike recess into which a compression spring is inserted which acts at one end upon the coupling member and at the other end upon a shoulder on the driven shaft. This spring is adapted when the brake is applied to press the movable brake member against the stationary brake member, and it also forms a force of a definite size for opposing the shifting force which is produced at the inclined cam surfaces of the slidable coupling member by the torque of the other coupling member when the latter is rotating.

The braking couple and the size of the effective shifting force may also be adjustable according to the invention, for example, by providing the above-mentioned shoulder which supports the compression spring not on the driven shaft itself but, for example, on a nut which is adjustably screwed to this shaft.

In place of a hollow drive shaft, it is also possible to provide a solid shaft. In this event, the two shafts will extend toward both sides of the coupling according to the invention. The amount of space required by the entire mechanism may then be reduced and an accurate operation of the coupling be insured by rotatably mounting the end of the driven shaft, which is connected to the axially slidable coupling member, on the end of the drive shaft or on the coupling member thereof so as to permit the required relative rotation of the two coupling members. The required braking force and the required opposing force for the axial shifting movement may then preferably be produced by several compression springs which act at one end upon the movable brake member and at the other end again upon a shoulder which, however, in this case forms an integral part of the driven shaft.

As previously mentioned, each inclined cam portion on one of the coupling members includes a short arcuate surface against which the respective projection of the other coupling member engages so that the brake will be held in the disengaged position, for example, when the motor is idling. If the motor is then switched off, the brake would remain in the disengaged position. In order to be able to apply the brake at this time, the invention further provides a condenser for delivering a countercurrent impulse to the motor circuit, whereby a countertorque will be produced and the projections on one coupling member will be moved away from the arcuate surfaces on the cam portions on the other coupling member and back to the starting position in which the brake will be applied.

In order to prevent a hard impact by the projections on one coupling member against the inclined cam surfaces on the other coupling member, the invention further provides that at least one coupling member is connected to its shaft by resilient means which cushion the impact which is normally exerted by the projections upon the cam portions when the driving force becomes effective. It is thus possible to protect the individual components of the mechanism and to extend the useful life of the prime mover. These resilient means may consist, for example, of natural rubber or a resilient plastic. One plastic which has proved to be particularly suitable for this purpose is known under the trade name "neoprene," consisting of a chloroprene polymerisate.

The coupling member may then be embedded in the layer of rubber or resilient plastic so that any vibrations or shocks which may be caused by the sudden impact of the projections upon the cam portions will be taken up and cushioned by the resilient layer and will not be further transmitted. This cushioning effect may be further improved by making the coupling member carrying the cam portions of several parts, and by embedding each part separately in the rubber or plastic. Each part of this coupling member is therefore provided with a pair of cam portions so as to permit the motor to operate in both directions of rotation.

The separation of this coupling member into several parts which are separately embedded in the layer of rubber or resilient plastic has the advantage that, because of the elasticity of the rubber or plastic which is effective in all directions including the peripheral direction, all of the projections on the other coupling member will surely engage uniformly with the corresponding cam portions on the first coupling member.

Another feature of this invention consists in the provision of an annular recess in the movable brake member, in which a ring of natural rubber or a resilient plastic is mounted, into which the above-mentioned parts of the coupling member are embedded. These parts are preferably made of a conical shape so that, when the driving force becomes effective, the forces acting upon the resilient ring will be transmitted thereto along the greatest possible surface area.

The present invention also provides for a bushing of natural rubber or a resilient plastic which is mounted between and firmly secured to the movable brake member and the spline bushing which is mounted on the driven shaft. This resilient bushing and the resilient ring as previously mentioned may be made of one piece of material. An arrangement of this kind has the advantage that not only the parts of the one coupling member, but also the movable brake member are resiliently connected to the spline bushing and thus also to the driven shaft which carries this bushing. The brake lining on the movable brake member will thus always engage along its entire surface with the stationary brake member and any possible inaccuracies in the brake lining caused by its manufacture, as the result of which the brake lining might not be accurately centered relative to the movable brake member, will be compensated due to the fact that because of the resilient connection of this brake member with the spline bushing, the spring which opposes the disengagement of the brake will press the brake lining on the movable brake member against the stationary brake member until the entire surface of the brake lining engages with the latter. Since the spline bushing which is acted upon by the spring then exerts relatively great forces upon the movable brake member, it is necessary that the resilient ring and the resilient bushing are firmly secured to the metallic spline bushing on the driven shaft and also to the movable brake member. For this purpose, the metallic spline bushing is made at the outside of a conical shape and has its maximum diameter at the end opposite to the coupling. This design insures a firm connection between the resilient ring and bushing and the metallic spline bushing on the driven shaft and prevents them from separating from each other.

Another feature of the invention consists in the provision of a second compression spring which is stronger but shorter than the first spring and extends parallel thereto within the socketlike recess in the spline bushing. This second spring does not become effective until the brake has been disengaged. Thus, when the first spring has been compressed to a certain extent after the brake has been disengaged and when the projections on the axially fixed brake member have moved for a certain distance along the respective cam portion on the movable coupling member, an annular shoulder on the spline bushing which is mounted on the driven shaft will come into engagement with the stronger compression spring and compress the same at a further relative rotation of the two coupling members. This second spring is so strong that, after the relative rotation has continued for a short time, it will stop such movement. The provision of this second spring renders any stops for the projections on the cam portion superfluous. It also has the advantage that an elastic engagement of the coupling will be insured even at the occurrence of very strong torques.

For adjusting the weaker compression spring, the threaded end portion of the driven shaft is provided with a nut which has a radially extending slot forming a pair of tongues which may be drawn against each other by a screw so that the nut will be securely locked on the end of the driven shaft.

According to a further feature of the invention, the entire mechanism may be considerably simplified and more easily and inexpensively produced if the drive shaft and the driven shaft extend in a vertical direction and the opposing force is formed by the gravity. In this event, no compression springs will be required for operating the brake.

The manufacture and assembly of the entire mechanism may be further simplified according to the invention by mounting the driven shaft on an extension of the drive shaft.

According to another modification of the invention, the coupling member on the drive shaft may be provided with radially extending studs which are operatively associated with the cam surfaces on the coupling member which is secured to the driven shaft. These studs may be produced in a simple manner by being made of a circular cross section. They may be secured to a ring, which, in turn, is mounted on the drive shaft. Since the ring and the studs are of relatively small dimensions, they may be made integrally with each other.

A further modification of the invention consists in designing each cam portion which cooperates with a radial stud as above described so that the arcuate surface, which connects the two inclined surfaces of a slope of about 30° and 20°, respectively, is made of a troughlike shape so as to arrest the respective stud when the motor runs at its normal speed.

Thus, when the motor is started, these studs will at first slide upon and along the cam surfaces which have a slope of about 30°, whereby the brake will be disengaged. Thereafter, the studs will move via the troughlike surfaces to the cam surfaces with a slope of about 20°. In order to limit the relative movement between the drive shaft and the driven shaft, the invention further provides a stop portion at the end of each cam for stopping the further movement of the respective stud when the motor runs at a high speed.

In order to facilitate the manufacture of the prime mover according to the invention, it is advisable to make the driven shaft and the movable brake member integral with each other. The prime mover may, for example, consist of a single-phase motor in which the starting condenser may be used for producing a countercurrent impulse. When the motor runs at its normal speed, the studs will be held in engagement with the troughlike surfaces of the cams. If the motor is switched off, the starting condenser will then deliver its stored energy as a countercurrent impulse to the motor and thereby produce a counter-torque, whereby the studs will be shifted off the troughlike surfaces and back to the starting position in which the brake will be applied.

The prime mover according to the invention is especially suitable for driving centrifugal machines, such as spin driers, centrifuges, or the like. If this prime mover is installed in a spin drier, the hollow shaft may be secured to the spinner drum by being provided with a flange which is riveted to the drum.

The above-mentioned objects, features, and advantages of the present invention will become further apparent from the following detailed description thereof, particularly when the same is read with reference to the accompanying drawings, in which—

FIGURE 1 shows a central vertical cross section of a prime mover according to the invention in the form of an electric motor;

FIGURE 1a is a fragmentary sectional view showing a modification of a detail;

FIGURE 2 shows a perspective view of a cam ring according to the invetnion;

FIGURE 3 shows a partial cross section of two interengaging cam rings according to FIGURE 2;

FIGURE 4 shows a perspective view of a cam ring according to a modification of the invention;

FIGURE 5 shows a partial side view of two associated cam rings according to FIGURE 4;

FIGURE 6 shows a central vertical cross section of a coupling according to the invention, in which the projections on one coupling member are formed by balls;

FIGURE 10 shows a central vertical cross section of another modification of the coupling;

FIGURE 11 shows a front view of one coupling member according to FIGURE 10;

FIGURE 12 shows a diagrammatic illustration of a modification of the cam surface on one cam member;

FIGURE 14 shows a cross section of still another modification of the coupling according to the invention;

FIGURE 15 shows a cross section taken along line XV—XV of FIGURE 14;

FIGURE 21 shows a vertical cross section of a spin drier with a motor according to the invention;

FIGURE 24 shows a perspective view of the movable brake member of the motor according to FIGURE 22 together with the coupling member thereof; while

Figure 7:
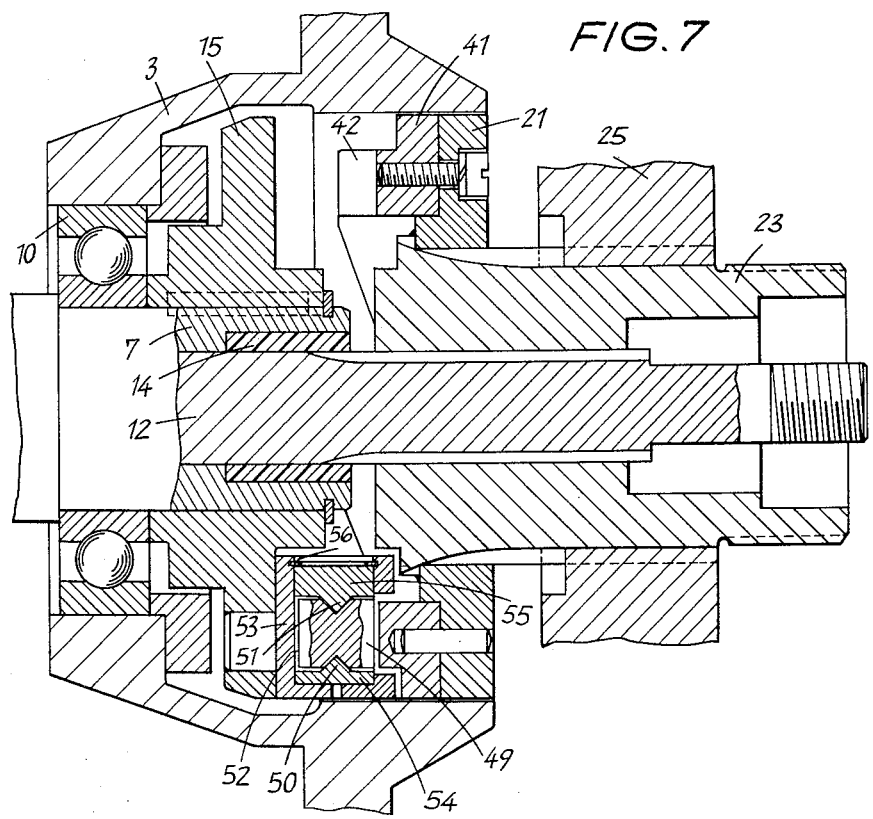
FIGURE 7 shows a modification of the coupling according to FIGURE 6, in which the projections on one coupling member are formed by rollers which are mounted between pointed centers.

Referring to the drawings, FIGURE 1 illustrates a three-phase squirrel-cage induction motor, the housing 1 of which is provided with a bearing plate 2 and a bearing plate 3. The stator laminations are indicated at 4 and the stator winding at 5. The cylindrical rotor 6 is mounted on a hollow shaft 7 and rigidly secured thereto. A ball bearing 10 which is inserted into the bearing plate 3 rotatably supports the hollow shaft 7 which is also rotatably supported by a sinter bearing 11 on the driven shaft 12 which, in turn, is rotatably supported by a second ball bearing 13 which is inserted into the bearing plate 2. Another sinter bearing 14 serves to support the driven shaft 12 so as to be rotatable within the hollow shaft 7. Aside from ball bearing 10, the lower end of the hollow shaft 7 is provided with a flange 15 which is secured thereto by means of one or more keys 16 and locked against any axial movement by a snap ring 17. A cam ring 18 is inserted into a recess in this flange 15 and rigidly secured to the flange by means of screws 19 and set pins 22. As illustrated particularly in FIGURE 2, the cam teeth 20 of this cam ring are in engagement with corresponding teeth on a similar cam ring 18' which is rigidly secured to a flange 21 and located in the proper position thereon by one or more set pins 22. Flange 21 is, in turn, welded to a spline socket 23 which is axially shiftable but non rotatable on the driven shaft 12 which at this end is made in the form of a spline shaft. The outer peripheral surface of socket 23 has a plurality of splines 24 on which a steel hub 25 of a brake member 26, which is rigidly secured thereto and preferably consists of aluminum, is mounted so as to be shiftable in the axial direction. This movable brake member 26 which also forms the ventilator of the motor has a brake lining 27 which cooperates with an inclined surface 28 on bearing plate 3 which serves as a brake drum. A nut 29 is screwed on a screw thread 30 on spline bushing 23 and rigidly secured to hub 25 by means of screws 31. Bushing 23 is further provided with a recess 32 in which a coil spring 33 is mounted which serves to press brake lining 27 on brake member 26 against the brake surface 28 and also the teeth 20 on the two cam rings 18 against each other. As shown in FIGURE 1, the lower end of shaft 12 is provided with a washer 34 which is locked against shifting in the axial direction by a snap ring 35. Between washer 34 and coil spring 33 two cup springs 36 are mounted which cooperate with coil spring 33 and are adapted to take up the forces occurring in the axial direction if the torques are very large.

In the modification according to FIGURE 1a, the snap ring 35 as shown in FIGURE 1 is replaced by a pair of nuts 35' on the end of shaft 12. By means of these nuts 35' it is possible to adjust the initial tension of springs 33 and 36.

The front part of motor 1 further carries an end cover 37 which is provided with air inlet slots, not shown, and covers all of the parts which are disposed at the outside of the motor proper and thus protects them toward the outside.

The operation of the electric motor according to FIGURE 1, which is shown therein in the disconnected position, is as follows:

As soon as the motor is switched on, rotor 6 will start to rotate and attempt to take along flange 15, which is rigidly secured to the hollow shaft 7, and cam ring 18 thereon. However, since at the time when the meter is switched on the brake is still active, cam ring 18' which is rigidly secured to flange 21 cannot be taken along immeditaely and at first only the cam ring 18 which is secured to flange 15 will be turned. Since the teeth 20 on both cam rings 18 and 18' have inclined cam surfaces 38 and 39, the surfaces on one cam ring press against the surfaces on the other cam ring with a force P, as indicated in FIGURE 3, resulting in an axially extending force Pa which produces an axial displacement of the cam ring 18' on flange 21 against the action of coil spring 33, and thus also an axial displacement of brake member 26 with brake lining 27 thereon, whereby the brake will be disengaged. At a continued rotation of rotor 6 and thus also of cam ring 18 which is secured to flage 15, spline bushing 23 may, at the occurrence of larger torques, shift in the axial direction to such an extent that cup springs 36 will be pressed by shoulder 40 against washer 34. This terminates the axial displacement of brake member 26 and brake lining 27, provided this has not already occurred due to the force of springs 33 and 36. Since members 15, 18, 18', 21, and 23 are thus rigidly connected to each other, the driven shaft 12 will be taken along by the rotating hollow shaft 7.

If the current is disconnected, there will no longer be any driving force; coil spring 33 then immediately presses bushing 23 and brake member 26 with brake lining 27 thereon against brake surface 28, so that the driven shaft 12 will be stopped. At the same time, the teeth on cam rings 18 and 18' again engage with each other so that the hollow shaft 7 and rotor 6 will also be stopped. After brake lining 27 has become worn off to a certain extent, it will be necessary to readjust brake member 26 on bushing 23 since cam rings 18 and 18' might otherwise engage with each other so firmly as to prevent the axial displacement of the movable brake member which is necessary for the braking action. For this purpose, screws 31 may be removed and nut 29 be tightened to such as extent that brake lining 27 will again be in engagement with the conical brake surface 28, whereupon screws 31 are again inserted and tightened.

According to the modification of the cam rings as illustrated in FIGURES 4 and 5, cam ring 41 is provided with three cam portions 42 with inclined surfaces, each of which is adapted to cooperate with a tooth 43 on a cam ring 44 which is rigidly secured to flange 15.

In place of teeth 43, as shown in FIGURE 5, cam ring 41 may, according to FIGURE 6, cooperate with balls 45 which are mounted in suitable apertures 46 in a disk-like ring 47 which is rigidly secured to flange 15. Apertures 46 are disposed coaxially with other apertures in flange 15 which contain bearing members 48 of a hardened material which prevents balls 45 from being depressed into the unhardened part 15.

According to FIGURE 7, balls 45 may be replaced by rollers 49, each of which is mounted between pointed centers 50 and 51 in a radially extending socket bore 52 in a cylindrical block 53 which is rigidly secured to flange 15 and provided with a slot. Each roller 49 is thus mounted so as to be freely rotatable within the slot. The bearing members 54 and 55 carrying the pointed centers 50 and 51, respectively, are held in their illustrated position by a snap ring 56.

Rollers 49 may, however, also be replaced by rollers 60', as shown in FIGURE 10, which are mounted on shafts 58'.

Figure 9:
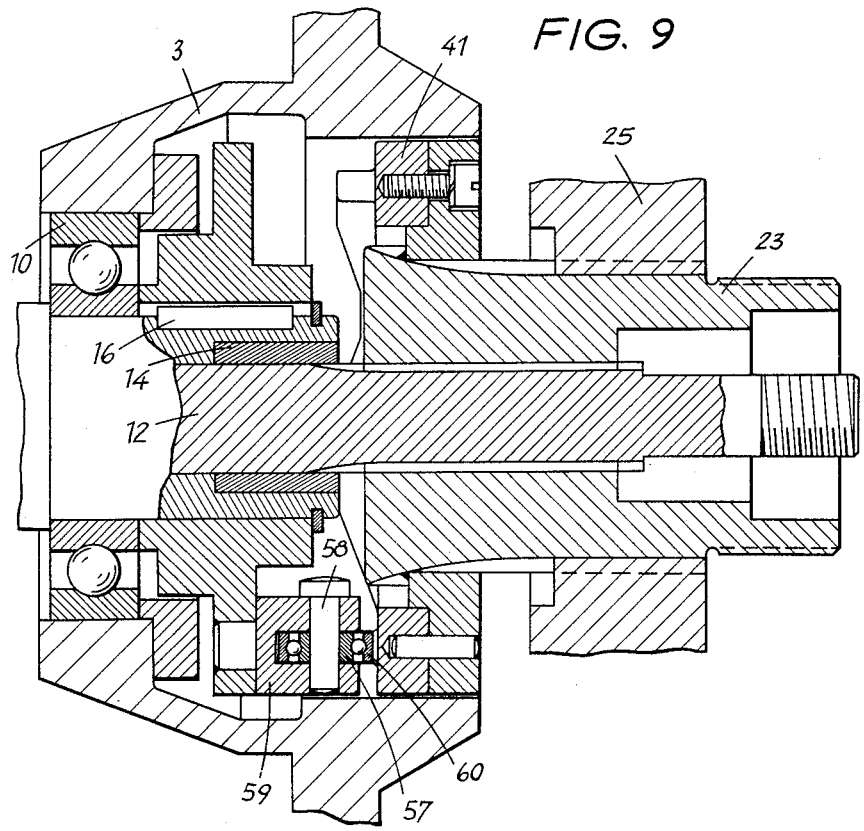
FIGURE 9 shows a further modification of the coupling, in which the projections on one coupling member are formed by ball bearings.

In the design of the coupling between hollow shaft 7 and shaft 12 as illustrated in FIGURE 9, rollers 49 according to FIGURE 7 are replaced by ball bearings 57 which are mounted on pins 58 which are tightly fitted in radial bores in a bearing member 59 which is rigidly secured to flange 15. Ball bearings 57 are mounted so that the outer races 60 roll substantially without friction along the cam surfaces 42 on cam ring 41. The bearing races 57 and 60 may, of course, also be replaced by a solid roller.

Figure 8:
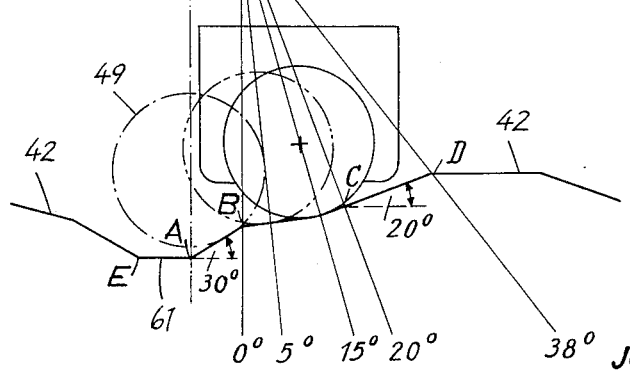
FIGURE 8 shows a diagrammatic illustration of the cam surface on one cam member.

FIGURE 8 diagrammatically illustrates one of the cam portions 42 on cam ring 41, as shown in FIGURE 4. Line E—A indicates the flat surface 61 from which the cam portions 42 project, starting at this flat surface with an inclined surface A—B of, for example, 30°. The inclined surface C—D extends, for example, at an angle of 20° to the flat surface 61. The two inclined surfaces A—B and C—D are connected by a short curved surface B—C. As illustrated in FIGURE 8, this curved surface B—C is attained by drawing from point B an arc in the direction toward point C at a radius which may, for example, be equal to twice the diameter of roller 49. Of course, this diameter may be varied, and in some cases it may amount only to one-half of the diameter of roller 49 or it may assume intermediate values. The center M of this arc B—C lies vertically above point B or it may be slightly shifted toward the right or left thereof. Line C—D forms the tangent to the arc B—C at the point C. In the particular example as illustrated in FIGURE 8, the tangent to the arc B—C at the point B extends parallel or nearly parallel to the line E—A.

As illustrated in FIGURES 4 and 8, cam portions 42 are equally and symmetrically designed, that is, the cam surfaces are of the same shape in both directions of rotation. FIGURE 8 also indicates by the angular degree as plotted therein the most suitable length proportions of surfaces B—C and C—D.

When the motor is in its braked inoperative position as shown in FIGURE 1, roller 49 will be located according to FIGURE 8 above the surface E—A and without engaging therewith. As soon as the motor is switched on, roller 49 will roll along the inclined surface A—B and stop at some point on surface B—D, the location of which depends upon the size of the load. The inclined surface A—B therefore serves for disengaging the brake when the motor is idling as well as when it is started under a load. Then the motor is idling, roller 49 will stop on the curved surface B—C shortly after rolling over the point B, whereby the brake will remain disengaged. If the motor is then loaded, roller 49 will roll up to point C or beyond the same, depending upon the size of the load. If the motor is started under a load, the movement of roller 49 from the flat surface E—A up to a point between B and D will be continuous.

If the current is disconnected when the motor is running under a load, roller 49 will roll under the action of coil spring 33 from a point between B and D beyond the point C and B toward point A. If no special provision was made to avoid this, it could happen that when the motor is switched off while idling, roller 49 may not be able to roll of its own accord from its position on the curved surface B—C, for example, at approximately 5°, downwardly beyond the point B, since the roller is then located within a curved path of a slope which has an arresting effect upon the roller. In order to insure that roller 49 will pass from this position beyond the point B to point A the motor may be given a reverse current of a low amperage, which may be done by means of a special switch or by means of a condenser.

The embodiment of the invention as illustrated in FIGURES 10 and 11 shows a further improvement over the embodiment according to FIGURE 9. An important feature of this improvement consists in the fact that cam ring 41' on flange 21 is provided at one end of each of its highest flat surfaces of the symmetrical cam portions 42' with an abutment 85. This abutment insures, that, even though a very strong torque occurs on the drive shaft, such torque will be transmitted to the driven shaft. The abutments 85 then stop rollers 60' from passing from the ascending part of the cam portion 42' to the descending part thereof.

Each abutment member 85 is further provided with a tongue-shaped extension 86 which projects at all times into an associated aperture 87 between each pair of adjacent roller supports 59 on coupling member 15. Each aperture 87 is provided at both ends in accordance with the two directions of rotation of the extension 86 with a resilient stop surface 88. These two stop surfaces 88 are spaced from each other at a suitable distance so that they will become effective as soon as the relative movement of the coupling members exceed the normal size in the event that the torque becomes excessive when the motor runs under full load.

These resilient stop surfaces 88 may be formed, for example, by resilient inserts 89 within aperture 87 at both sides of extension 86. As shown in FIGURE 10, the resilient inserts 89 and the sidewalls of aperture 87 may, for example, be of a dovetailed shape in order to secure the inserts in place. Obviously, instead of providing such inserts of an elastic material, it is also possible to provide spring-loaded stop surfaces.

The cam projection 42', as diagrammatically illustrated in FIGURE 12, differs in design from the cam 42 as shown in FIGURE 8. Adjacent to the flat surface E—A, there is the starting portion A—F with a slope of about 5° to 10° which then merges gradually and arcuately into the end portion F—G which has a slope of about 20° to 25°.

While the cam according to FIGURE 8 permits the brake to be disengaged when the motor is not under a load, and also continues to hold the brake in the disengaged position as long as there is no load, the cam according to FIGURE 12 requires for disengaging the brake a certain counter torque of a size of approximately 10% of the maximum load moment. This cam does, however, not require any additional opposing force in order to produce a braking action when the driving force ceases.

Figure 13:
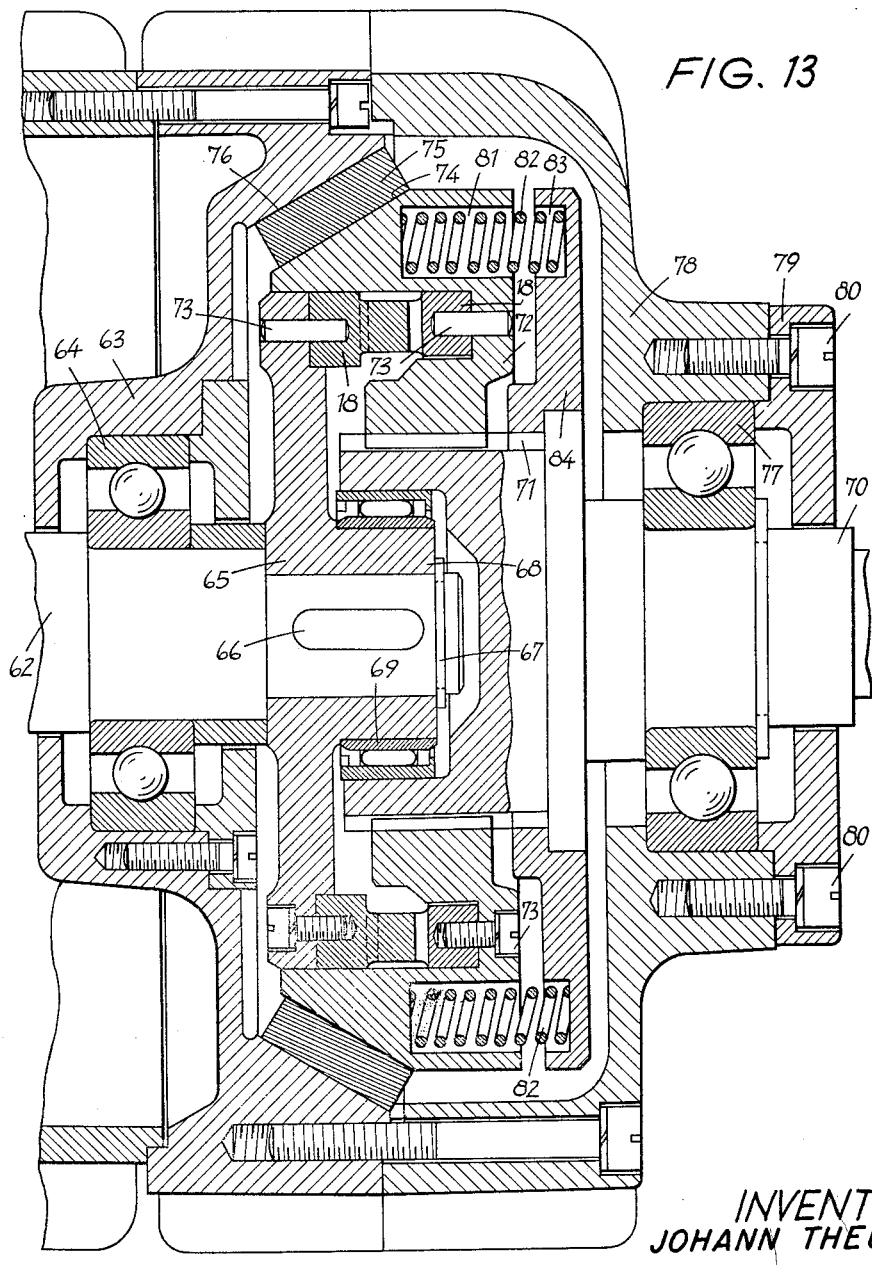
FIGURE 13 shows a central vertical cross section of a further modification of the coupling according to the invention.

A further modification of the coupling according to the invention is illustrated in FIGURE 13, in which the drive shaft 62 is rotatably supported by a ball bearing 64 which is mounted in a recess in a bearing plate 63. A flange 65 is rigidly secured to the end of shaft 62 by means of a key 66 and the flange is secured against shifting in the axial direction by a snap ring 67. Flange 65 has a bushinglike extension 68 for supporting a needle bearing 69 on which the driven shaft 70 is mounted. At its left end above needle bearing 69, a driven shaft 70 is provided with axially extending spline grooves 71 in which a flange 72 is guided which is rigidly connected by means of screws and pins 73 to a cam ring 18 and is also provided with an inclined peripheral surface 74 on which a brake lining 75 is mounted. When the brake is in the applied position as illustrated in FIGURE 13, brake lining 75 is in engagement with an inclined surface 76 of bearing plate 63. A second cam ring 18 is mounted by means of screws and set pins 73 on flange 65. The driven shaft 70 is further supported by a ball bearing 77 which is inserted into a suitable recess in an end cap 78 which has a cover 79 secured thereto by means of screws 80 for covering ball bearing 77.

In place of cam rings 18, the rings may be provided which have been previously described and which may also be provided either with balls 45, rollers 49, ball bearings 60, or rollers 60'. Flange 72 has bores 81 into which coil springs 82 are inserted, the outer ends of which are mounted in recesses 83 in a flange 84 which is rigidly secured to the driven shaft 70 and locked against rotation by splines 71.

The operation of the coupling as illustrated in FIGURE 13 is similar to that of a coupling previously described. When the driving machine is started, the two shafts are turned relative to each other whereby flange 72 will be shifted in the axial direction so that brake 74, 75 will be disengaged. If the driving force ceases, springs 82 will press flange 72 into the braking position as illustrated in FIGURE 13, whereupon the brake will become effective and both the driven shaft 70 and the drive shaft 62 will be stopped.

Drive shaft 62 does, however, not also have to form the drive shaft of the driving machine, but it may be, for example, a shaft which is driven by any suitable machine and adapted to be engaged and disengaged by a pulley gear, and particularly it may be the shaft of a transmission which is only indirectly driven by the driving machine.

FIGURE 15 only illustrates the end of an electric motor which contains the coupling according to the invention. Just like the electric motor according to FIGURE 1, this motor also has a hollow shaft 91 on which the stator, not shown, is secured and which is rotatably mounted in bearing plate 93 by means of a ball bearing 92. The driven shaft 95 is rotatably mounted within hollow shaft 91 by means of a sinter bearing 94 which is secured in hollow shaft 91. The lower end of hollow shaft 91, as seen in FIGURE 15, carries a flange 97 which is secured thereto by a key 96 and locked in position by a snap ring 98. Flange 97 is provided with extensions at a distance of 120° from each other and a radially extending bore 100 in each of these extensions for mounting a pin 99. These pins 99 rotatably support rollers 101 in suitable slots in flange 97.

Rollers 101 are operatively associated with cam portions 102 which are rigidly secured to or integral with segments 103 which are embedded within a ring 104 which may consist of natural rubber or a resilient plastic. One material which has proven to be particularly suitable for this purpose is a plastic known under the trade name "neoprene." Ring 104 has mounted integrally thereon a bushing 105 of the same material, and both of them connect the movable brake member 108 with a metallic bushing 106 which is mounted on the driven shaft 95 by splines 107 so as to be axially slidable but nonrotatable thereon. As its upper end as seen in FIGURE 15 the movable brake member 108 has an inclined surface 109 which is provided with a brake lining 110. When the brake is in the applied position as shown, brake lining 110 engages with a similarly inclined brake surface 111 on bearing plate 93.

Bushing 106 has a socketlike recess 112 in which a compression spring 113 is mounted. One end of spring 113 acts upon the bottom 114 of recess 112, while the other end acts upon an annular shoulder 115 of a nut 116 which is screwed upon the screw thread 117 on the lower end of the driven shaft 95. Nut 116 has a slot 118 which divides the nut at this point into two tongues 119 and 120 which are drawn together by a screw 121, whereby nut 116 will be clamped tightly on screw thread 117 of the driven shaft 95. For adjusting or removing nut 116 by means of a socket wrench, the same is provided with bores 116'. At the inside of spring 113, a second compression spring 122 is mounted which is shorter but stronger than spring 113.

In order to reduce the weight of the movable brake member 108, the same is provided with recesses 123 and 124. Recess 124 is covered by a disk 125 for the following purpose. Ring 104 and bushing 105 thereon are preferably vulcanized between the metallic parts, and for this purpose bushing 106, brake member 108, coupling members 103, and the angular disk 125 are inserted in the position as shown in FIGURE 15 into a suitable mold. In order to prevent the rubber or neoprene of ring 104 and bushing 105 from passing into recess 124, this recess is covered by the angular disk 125. The movable brake member 108 is further provided with ribs 126 for ventilating the motor.

The above-mentioned parts of the motor are covered by a hood 127 which is secured to the housing of the motor, not shown. The end of hood 127 has a large aperture 130 which is covered by a disk 129 which is provided with smaller apertures 128.

Figures 18, 19:
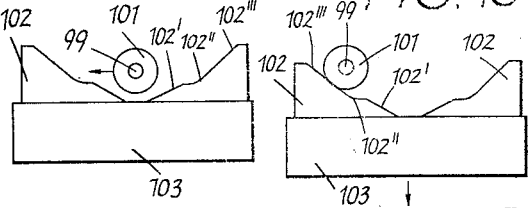
FIGURE 18 shows a diagrammatic side view of a coupling part according to FIGURE 17 in engagement with an associated projection on the other coupling member in the form of a roller.
FIGURE 19 shows a view similar to FIGURE 18, in which the roller is out of engagement with the cam surfaces.

The electric motor as illustrated in FIGURES 14 and 15 operate as follows:

In the inoperative position of the electric motor as shown in FIGURE 15, in which the brake is applied, rollers 101 which are rotatably mounted in flange 97 and disposed at an angle of 120° relative to each other, are in the position as illustrated in FIGURE 19, in which they do not engage either the cam portions 102 or the segments 103. As soon as the motor is switched on, hollow shaft 91 with flange 97 thereon begin to turn, whereby 101 move upon and along the inclined surface 102', as shown in FIGURES 18 and 19, until they are arrested in a trough curve 102". During the movement of rollers 101 along surface 102', an axially directed force is exerted upon cam portions 102 and segments 103, and also through the resilient ring 104 upon the movable brake member 108, so that these parts will be shifted in the axial direction and the brake will thereby be disengaged. If torques of a greater force occur, rollers 101 will move upon the inclined surface 102''', whereby not only the compression spring 113 but also the stronger compression spring 122 will be compressed. This compression spring 102 prevents rollers 101 from moving along the inclined surface 102''' beyond the cam portions 102 and therefore functions as a stop member.

When rollers 101 engage with the inclined surfaces 102' of cam portions 102, they exert upon the latter an impact which is taken up and cushioned by the resilient ring 104 and is thus not transmitted either to bushing 106 or to the driven shaft 95 or the movable brake member 108. There will also be no audible noise from this impact, and the driven shaft 95 as well as the movable brake member 108 will be protected.

When the motor is switched off, the driving force ceases so that springs 122 and 113 will become active. These two springs will at first force bushing 106 and the movable brake member 108, as well as segments 103 with the curved portions 102 backwardly to such an extent that rollers 101 will pass into the troughshaped part 102". In the meantime, a condenser, not shown, which is connected into the motor circuit and may be, for example, the sparking condenser in a single-phase motor, has delivered the amount of electricity stored up therein as a countercurrent impulse to the motor, whereby a countertorque will be produced and rollers 101 will be moved out of the troughshaped portion 102". Since spring 122 is then released, spring 113 will alone force parts 106, 108, and 103 backwardly until brake lining 110 on brake member 108 engages with the stationary brake surface 111 and rollers 101 will move to the position as illustrated in FIGURE 19.

Because of the resilient connection between the movable brake member 108 and bushing 106 through ring 104 and bushing 105, brake lining 110 can then engage with its entire conical surface upon the inclined surface 111 since the mentioned resilient connection permits a relative movement between the movable brake member 108 and the stationary brake surface 111. This resilient connection also prevents a hard braking impact when brake lining 110 engages with the stationary brake surface 111, so that the movable parts and especially the driven shaft 95 will be protected.

Figure 20:
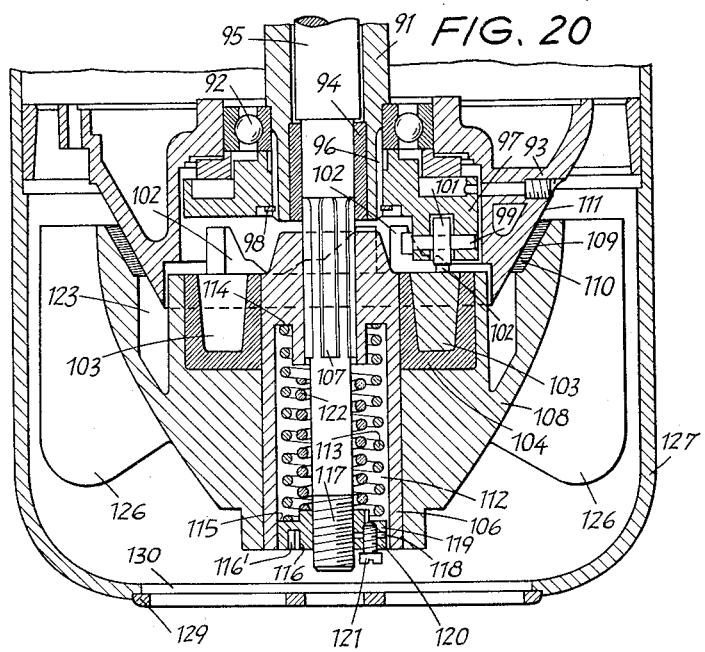
FIGURE 20 shows a cross section similar to FIGURE 14, but of a coupling according to a further modification of the invention.
Figure 16:
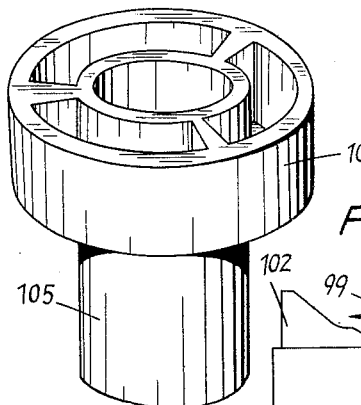
FIGURE 16 shows a perspective view of a ring of elastic material for embedding the coupling parts of one coupling member according to FIGURES 14 and 15, with a socket thereon of the same materal.
Figure 17:
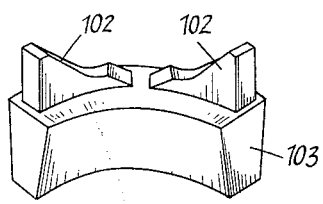
FIGURE 17 shows a perspective view of a coupling part with a pair of cam members according to FIGURE 14.

FIGURE 20 illustrates a further embodiment of the invention, in which there is no resilient connection between bushing 106 and the movable brake member 108. The resilient bushing 105 is omitted and only a resilient ring 104 is provided in which the segments 103 with the cam portions 102 thereon are embedded. The movable brake member 108 is therefore mounted on and rigidly secured to bushing 106. Thus, the impacts occurring when the driving force starts are also in this embodiment taken up by the resilient ring 104 and they are neither transmitted to the movable brake member 108 nor to the bushing 106 and the driven shaft 95.

Figure 22:
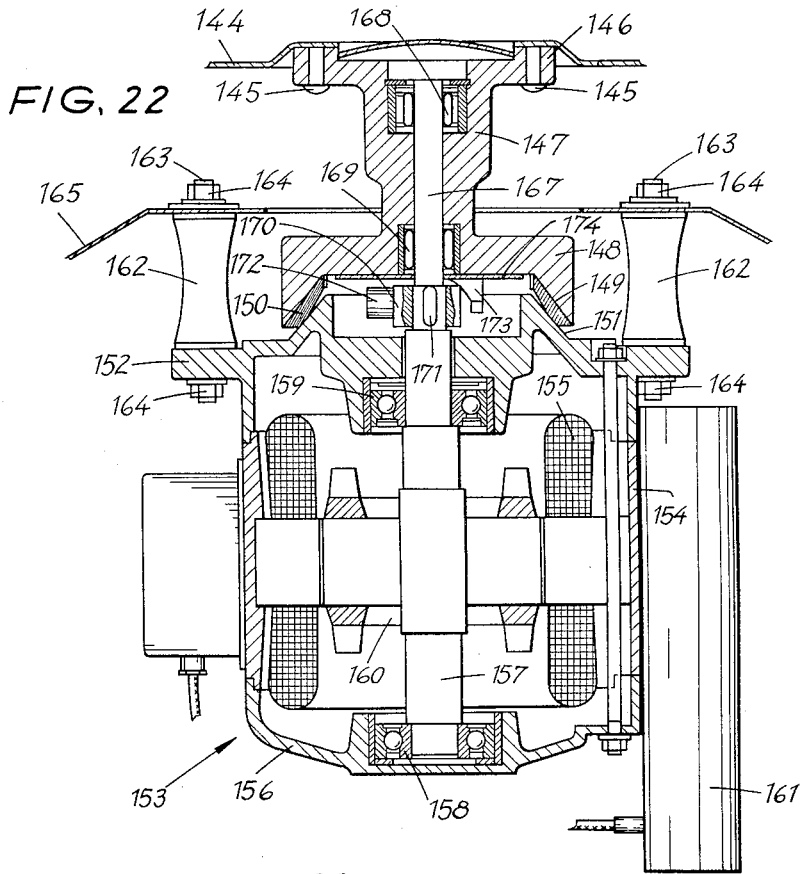
FIGURE 22 shows a vertical cross section of the motor according to FIGURE 21.

FIGURE 21 illustrates a spin drier which has a housing 141 with a cover 142 thereon which has a funnel 143 through which the wet laundry is to be thrown into the spinning drum 144 to be spun dry therein. The spinning drum 144 is secured by rivets 145 to a flange 146 on a hollow shaft 147. The lower end of this shaft 147 is provided with a flange 148 which serves as a brake member and is provided at the inside with a conical surface 149, as shown in FIGURE 22, which carries a brake lining 150. This brake lining 150 is operatively associated with a conical brake surface 151 on the upper bearing plate 152 of the electric motor 153. The housing of motor 153 has a central part 154 in which the stator laminations and the stator winding 155 are mounted. At its lower end, motor 153 is closed by a bearing plate 156. The motor shaft 157 is mounted on ball bearings 158 and 159 which are secured in the two bearing plates 156 and 152, respectively. Shaft 157 carries a rotor 160. The central part 154 of the housing of motor 153 supports a condenser 161 for starting the motor. Motor 153 which is designed as a single-phase motor is secured by spacing members 162, which may, for example, consist of rubber, and bolts 163 with nuts 164 on a partition 165 which is secured in housing 141 by means of an annular corrugation 166.

Figure 23:
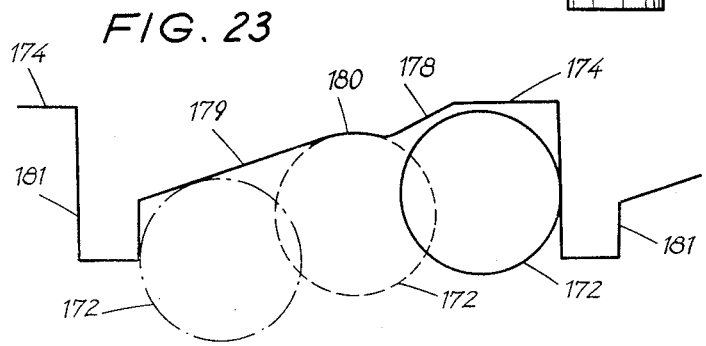
FIGURE 23 shows a diagrammatic illustration of one of the coupling members of the motor according to FIGURE 22.
Figure 24:
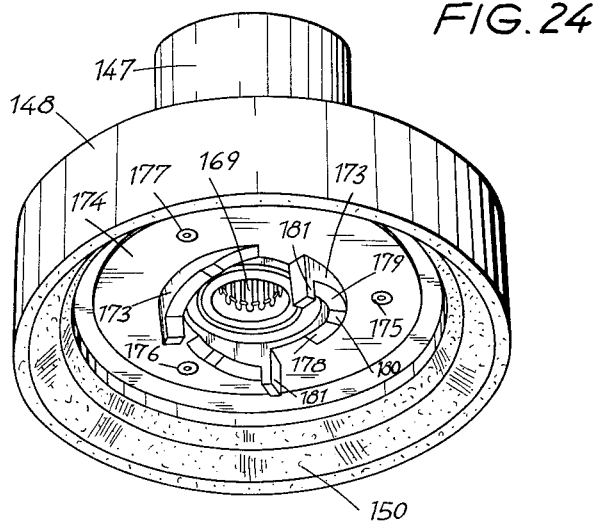
Figure 25:
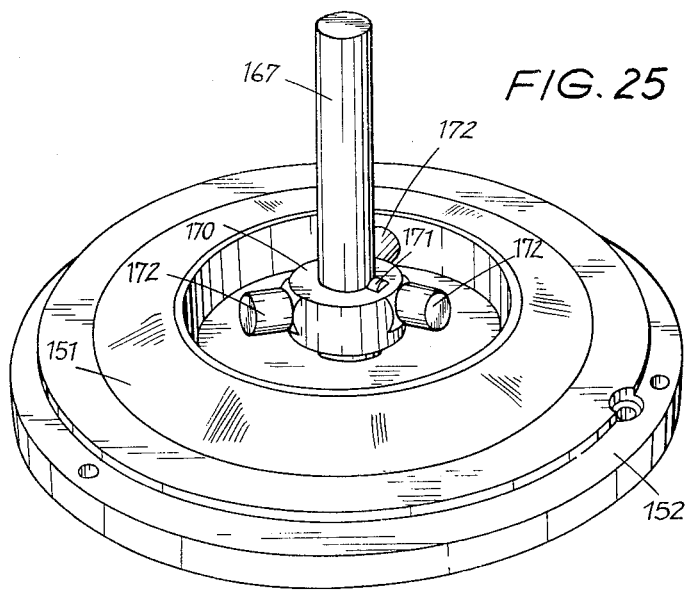
FIGURE 25 shows a perspective view of the upper part of the motor according to FIGURE 22 with the shaft projecting therefrom.

Motor shaft 157 has an extension 167 integral therewith on which the hollow shaft 147 is mounted by means of needle bearings 168 and 169. Shaft portion 167 carries a ring 170 which is rigidly secured thereto by means of a key 172. This ring 170 has integrally therewith three studs 172 which extend radially therefrom at an angle 120° to each other, as illustrated particularly in FIGURE 25. Studs 172 are operatively associated with cam members 173 which are secured to a plate 174 which, in turn, is rigidly secured at 175, 176, and 177 to flange 148, as illustrated particularly in FIGURE 24. Each cam member 173 has an inclined cam surface 178 with a slope of approximately 30° and another cam surface 179 with a slope of approximately 20°. These two cam surfaces 178 and 179 are connected by a short trough-shaped surface 180. At the end of cam surface 179, each cam member 173 has a vertical projection 181 which serves as a stop member for one of the studs 172. An enlarged diagrammatic view of cam member 173 in an extended position is illustrated in FIGURE 23 and shows the two cam surfaces 178 and 179 and the trough-shaped connecting surface 180.

The operation of the machine as illustrated in FIGURES 21 to 25 is as follows:

After the laundry which is to be spun dry has been deposited in the spinning drum 144, the main switch is operated to start the electric motor 153. The motor is at this time in the position as illustrated in FIGURE 22 in which brake 148 to 151 is applied and in which studs 172 are in the full-drawn position, as illustrated in FIGURE 23. Plate 174 will at this time not be in engagement with the studs 172 since flange 148 with brake lining 150 engages with the conical surface 151 of bearing plate 152. When the main switch is closed, a torque is produced in motor 153 whereby shaft 157 and ring 170 are turned so that studs 172 will engage with cam surface 178 and, at a strong countertorque slide over the trough-shaped connecting surface 180 and along cam surface 179 until they finally come to a stop on the projection 181. As soon as studs 172 engage with cam surface 178, an axially directed force component will be produced which lifts the movable brake member 148 and hollow shaft 147 as well as spinning drum 144 which is rigidly secured thereto, whereby brake 148 to 151 will be disengaged. At the further rotation of motor shaft 157, hollow shaft 147 and thus also spinning drum 144 will be taken along and likewise rotated. As soon as the normal operating speed of spinning drum 144 is reached, studs 172 will slide downwardly along cam surface 179 until they reach the trough-shaped connecting surface 180 on which they will be arrested as long as the machine remains in operation.

As soon as motor 153 is switched off, the starting condenser 161 will deliver to motor 153 the amount of electricity stored up therein in a form of a countercurrent impulse, whereby a countertorque will be produced in the motor.

Shaft 157 will then turn in the direction opposite to its normal direction of rotation and thereby move the stud 172 out of the position in which they are in engagement with the trough-shaped surfaces 180, as indicated in dotted lines in FIGURE 23, and into the starting position as shown in a full line in which brake 148 to 151 is applied.

As previously mentioned, when the motor is speeding up, studs 172 will be in engagement with the projections 181, as indicated in dot-and-dash lines in FIGURE 23. If the motor is switched off at this time, the driving force will cease, whereupon the weight of spinning drum 144 will become active so that cam surface 179, the troughshaped surface 180 and cam surface 178 of cam members 173 will slide along studs 172 until the cam members 173 again assume the position relative to studs 172, as shown in a full line in FIGURE 23.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. An automatic brake arrangement for a prime mover, comprising, in combination: a drive shaft and a driven shaft; a brake comprising cooperating movable and stationary brake components; and a coupling device comprising first and second coupling components connected to said drive and driven shafts, respectively, for coupling the same together, said movable brake component being connected to one of said coupling components and being movable together therewith as a unit in axial direction with respect to the other coupling component, one of said coupling components having curved projection means and the other of said coupling components having inclined surface means, said inclined surface means having two surface portions of different slope which are connected by a concave surface portion whose radius of curvature is at least as great as the radius of curvature of said curved projection means, whereby under the influence of an axially directed force said means will abut against each other and will move along each other when there is relative rotation upon the application or removal of a driving force so that when the driving force is applied, said unit shifts in axial direction to move said movable brake component out of engagement with said stationary brake component, thereby releasing said brake, and when the driving force is removed, said movable brake component is brought back into engagement with said stationary brake component, thereby re-engaging said brake, one of said two surface portions of different slope serving to release said brake and the other to hold said brake in released condition.

2. An automatic brake arrangement as defined in claim 1 wherein said concave surface of said inclined surface means is trough-shaped and wherein said curved projection means comprise roller means.

3. An autommatic brake arrangement as defined in claim 1 wherein the first of said two surface portions of different slope forms an angle of approximately 30° with a plane normal to the axis of said drive shaft and wherein the second of said two surface portions forms an angle of approximately 20° with said plane.

4. An automatic brake arrangement as defined in claim 1 wherein the first of said two surface portions of different slope forms an angle of approximately 5° to 10° with a plane normal to the axis of said drive shaft and wherein the second of said two surface portions forms an angle of approximately 20° to 25° with said plane.

5. An automatic brake arrangement as defined in claim 1 wherein said inclined surface means are so shaped as to be of mirror-image symmetry.

6. An automatic brake arrangement as defined in claim 1 wherein said inclined surface means have at the end of the second of said two surface portions of different slope an axially directed portion, said other coupling component being formed with a recess within which said axially directed portion is received, the sides of said recess which serve as abutments for said axially directed portion being provided with elastic means.

7. An automatic brake arrangement as defined in claim 1 wherein a portion of said driven shaft is splined, there being a non-rotatable but axially displaceable sleeve mounted on said splined portion of said driven shaft, said sleeve carrying said movable brake component and said second coupling component.

8. An automatic brake arrangement as defined in claim 7 wherein said sleeve is threaded, there being a nut threaded onto said sleeve, said movable brake component being detachably connected to said nut.

9. An automatic brake arrangement as defined in claim 7 wherein said sleeve is formed with a cylindrical recess and wherein said driven shaft carries a threaded nut; further comprising a spring device for urging said brake components into engagement with each other, said spring device comprising at least one compression spring arranged in said recess and interposed between the bottom thereof and said nut.

10. An automatic brake arrangement as defined in claim 9 wherein said spring device comprises a further compression spring which is likewise arranged in said recess and is interposed between the bottom thereof and said nut, said further compression spring being stronger than the first spring and becoming effective only after said brake has been released.

11. An automatic brake arrangement as defined in claim 1, further comprising a resilient insert interposed between one of said shafts and the coupling component connected therewith.

12. An automatic brake arrangement as defined in claim 11 wherein said movable brake component is formed with an annular recess within which there is arranged a ring of elastomeric material, the means of said second coupling component being embedded in said ring.

13. An automatic brake arrangement as defined in claim 12 wherein said insert is tubular and is connected to a sleeve splined onto said driven shaft, said tubular insert and said ring being integral with each other.

14. An automatic brake arrangement as defined in claim 1 wherein said curved projection means comprises a ring having radially directed round bolts and wherein said inclined surface means have abutments arranged at the ends, said abutments cooperating with said bolts.

15. An automatic brake arrangement as defined in claim 1, wherein said prime mover is an electric motor, said motor being connected to a condenser for supplying said motor, upon interruption of current, with a counter-current pulse, whereby said projection means are moved out of said concave surface portion of said inclined surface means, thereby activating said brake.

References Cited in the file of this patent

UNITED STATES PATENTS

| | | |
|---|---|---|
| 2,613,342 | Thompson et al. | Oct. 7, 1952 |
| 2,783,861 | Jungles | Mar. 5, 1957 |
| 2,826,056 | Bruckman | Mar. 11, 1958 |
| 2,925,157 | Davis | Feb. 16, 1960 |

FOREIGN PATENTS

| | | |
|---|---|---|
| 634,062 | Germany | Aug. 15, 1936 |